United States Patent
Mikami (10) Patent No.: US 7,636,176 B2
(45) Date of Patent: Dec. 22, 2009

(54) IMAGE FORMING APPARATUS, METHOD AND STORAGE MEDIUM

(75) Inventor: Kenji Mikami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 10/765,398

(22) Filed: Jan. 28, 2004

(65) Prior Publication Data

US 2004/0223174 A1 Nov. 11, 2004

(30) Foreign Application Priority Data

Jan. 31, 2003 (JP) ............... 2003-024967

(51) Int. Cl.
*G06K 1/00* (2006.01)
*G06K 9/34* (2006.01)

(52) U.S. Cl. ............ 358/1.9; 358/1.8; 358/2.1; 358/502; 358/518; 358/1.13; 358/515; 358/527; 358/1.15; 358/401; 382/176; 382/162; 382/165; 382/167; 382/189; 345/636; 345/467; 345/468; 345/469; 345/619

(58) Field of Classification Search ............. 358/1.9, 358/1.1, 1.2, 2.1, 1.14, 3.2, 518, 504, 515, 358/401, 403, 517, 1.8, 1.3, 502, 1.16, 3.3, 358/1.13, 1.18, 527; 382/162, 167, 189, 382/176, 165; 345/636, 467, 468, 469.1, 345/470, 17, 26, 619
See application file for complete search history.

(56) References Cited

U.S. PATENT DOCUMENTS 6,067,377 A 5/2000 Hata
6,084,604 A * 7/2000 Moriyama et al. ............. 347/15
6,084,689 A * 7/2000 Mo ............................. 358/1.9
7,298,522 B2 * 11/2007 Sugimoto ..................... 358/1.3
2003/0043392 A1 * 3/2003 Sugimoto ..................... 358/1.9
2003/0047099 A1 * 3/2003 Hanyu ......................... 101/484

FOREIGN PATENT DOCUMENTS

| JP | 6-161195 A | 6/1994 |
| JP | 9-149281 A | 6/1997 |
| JP | 11-205612 A | 7/1999 |
| JP | 2000-338827 | 12/2000 |
| JP | 2002-166602 | 6/2002 |
| JP | 2002-214862 | 7/2002 |
| JP | 2003-76097 | 3/2003 |

* cited by examiner

*Primary Examiner*—King Y Poon
*Assistant Examiner*—Steven Kau
(74) *Attorney, Agent, or Firm*—Fitzpatrick, Cella, Harper & Scinto (57) ABSTRACT

The invention seeks to suitably adjust the amount of a toner reduction in accordance with the type of image (object). To attain this object, an image forming apparatus according to the present invention comprises a discrimination unit for discriminating types of objects contained in input data; and a processing unit for applying reduction processing, which suppresses amount of colorant, to a thin line in a graphics if result of discrimination by said discrimination unit is that an object is a graphic;
wherein whether reduction processing is to be executed or not can be selected by a user.

5 Claims, 7 Drawing Sheets

[DESCRIPTION OF R1401]
char_color={0.0,0.0,0.0,1.0};   ←—L1411
strnig1="IC";   ←—L1412
put_char(0.0,0.0,0.3,0.1,string1);   ←—L1413

[DESCRIPTION OF R1402]
line_color={1.0,0.0,0.0,0.0};   ←—L1421
put_line(0.9,0.0,0.9,1.0,0.1);   ←—L1422

[DESCRIPTION OF R1403]
image1={CMYK,8,5,5,C0,M0,Y0,K0,   ←—L1431
　　　　　　C1,M1,Y1,K1
　　　　　　⋮
　　　　　C24,M24,Y24,K24};
put_image(0.0,0.5,0.5,0.5,image1);   ←—L1432

IMAGE FORMING APPARATUS, METHOD AND STORAGE MEDIUM

FIELD OF THE INVENTION

This invention relates to an image forming apparatus, method and storage medium ideal for forming a color image by, e.g., electrophotography.

BACKGROUND OF THE INVENTION

When a computer graphics image created by a computer, electronic data created by page description language or image data created by an external input device such as a digital camera is printed out on a recording medium by an image forming apparatus such as a color printer, the usual practice is to form a color image using a plurality of colorants (toners or inks, etc.) of such colors as cyan (C), magenta (M), yellow (Y) and black (K).

In order to faithfully reproduce the color of an original color image in an image forming apparatus for thus forming the color image, the image signal is corrected by executing a masking operation, which takes the spectral characteristics of the colorant into consideration, and color correction processing based upon a profile created for every output device for the purpose of accommodating for a difference between color spaces in different types of machines. There are also cases where an image is formed without applying any modification at all to signal values of each of the colors in the electronic data.

In general, when an image is formed on a recording medium using colorants such as toners or inks in an image forming apparatus, there is a possibility that output results will not be acceptable or that the image forming apparatus itself may sustain physical damage depending upon the type of recording medium or process conditions involved in image formation.

In a case where processing based upon amount of colorant (toner) that has exceeded a suitable amount is executed in an electrophotographic printer, poor transfer and fixing occur if the amount of applied toner for each color component becomes excessive, and this can lead to damage to the printer engine and to a decline in image quality ascribable to "toner spray". For example, it is known that when the amount of applied toner of each of the color components for cyan (C), magenta (M), yellow (Y) and black (K) becomes excessive in an electrophotographic color printer, "toner spray" occurs particularly in characters and thin lines if the image to be printed is a character image or computer graphics image. Accordingly, if there is a large amount of applied toner, image processing for converting the value of data representing each color to a low value is executed.

Processing for limiting the number of colors of output image data (the overall signal value of each of the colors C, M, Y, K) upon thus taking into consideration the total amount of colorant that is output in dependence upon the characteristic of the output device is referred to generally as toner reduction processing (see the specification of Japanese Patent Application Laid-Open No. 2002-166602), particularly in an electrophotographic image forming apparatus.

On the other hand, in a case where the amount of applied toner is large when forming part of a photographic image, the intended density can better be obtained by printing the image using the image data as is without execute toner reduction processing, this being achieved in a way that will not damage the printer engine.

Accordingly, in the conventional image forming apparatus, whether or not tone reduction processing is executed is changed over from print job to print job. The option to make the changeover for every print job is decided by a parameter that turns a toner-reduction processing mode ON or OFF (i.e., that turns toner reduction ON or OFF).

With the conventional image forming apparatus, however, toner spray in characters and thin lines will become conspicuous if a document that is a mixture of characters or thin lines and photographic images is printed with the toner-reduction processing mode left OFF (i.e., with toner reduction left OFF).

On other hand, if printing is carried out with the toner-reduction processing mode left ON (i.e., with toner reduction left ON), there are instances where the density of photographic images will be inadequate owing to toner reduction processing.

SUMMARY OF THE INVENTION

Accordingly, an object of the present invention is to provide an image forming apparatus, method and storage medium so adapted that the amount of colorant can be controlled properly for every type of image, such as a photographic image, graphic or text, in accordance with the content of the image to be formed.

Moreover, another object of the present invention is to provide an image forming apparatus, method and storage medium so adapted that a reduction processing in which the amount of colorant is controlled for a thin line of a graphic can be performed in response to a selection by a user.

According to the present invention, the foregoing object is attained by providing an image processing apparatus which comprises a discrimination unit for discriminating types of objects contained in input data; and a processing unit for applying reduction processing, which suppresses amount of colorant, to a thin line in a graphics if result of discrimination by the discrimination unit is that an object is a graphic; wherein whether reduction processing is to be executed or not can be selected by a user.

Alternatively, according to the another aspect of the present invention, the foregoing object is attained by providing an image processing apparatus which comprises a discrimination unit for discriminating types of objects contained in input data; and a processing unit for applying reduction processing, which suppresses amount of colorant that is necessary to form an object into an image to an amount conforming to the type of object, in accordance with result of discrimination by the discrimination unit; wherein amount of the colorant can be specified by a user object by object.

Preferably, the processing unit foregoes application of the reduction processing to an object of a certain type.

Preferably, the discrimination unit discriminates the type of object based upon an instruction contained in image data described in page description language.

Thus, the toner-reduction processing mode can be switched between ON and OFF depending on the type of object.

Furthermore, the amount of colorant can be suppressed depending on the type of object.

Furthermore, reduction of the amount of colorant for a thin line can be controlled in response to a selection by a user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

A first embodiment of the present invention will now be described in detail with reference to the drawings.

(System Configuration)

Figure 2:
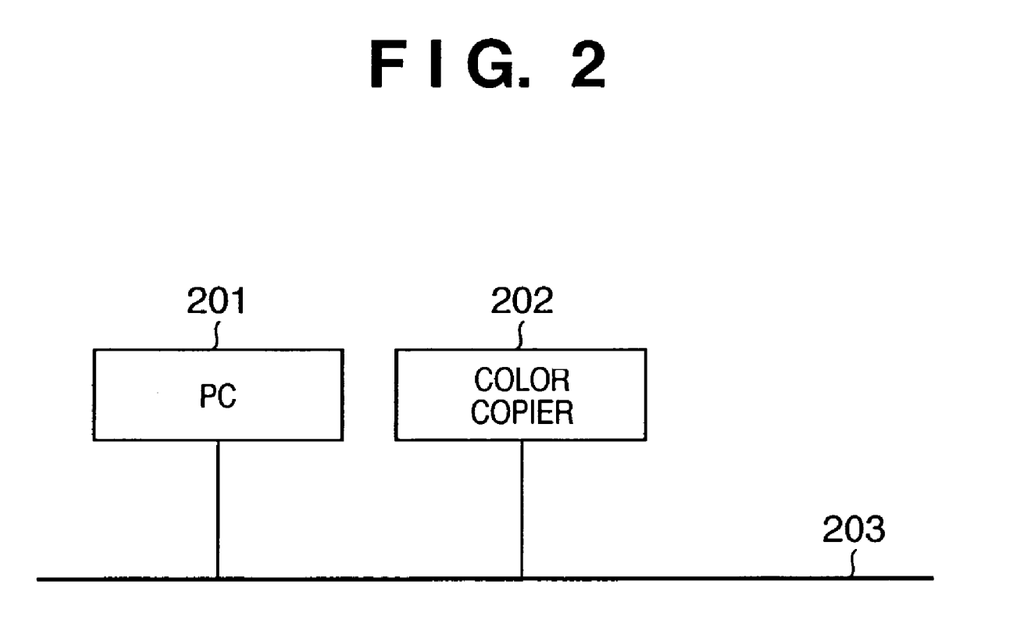
FIG. 2 is a diagram showing the configuration of a system according to this embodiment.

FIG. 2 illustrates the configuration of a system according to this embodiment. In FIG. 2, a network 203 is constituted by a 100BaseT Ethernet (registered trademark). A personal computer (PC) 201 and a color copier 202 are connected to the network 203. Though other devices also are connected to the network 203, these are not illustrated. The color copier 202 functions as a network-compatible Postscript (registered trademark) printer and prints color images that are output from the PC 201.

(Internal Blocks)

Figure 1:
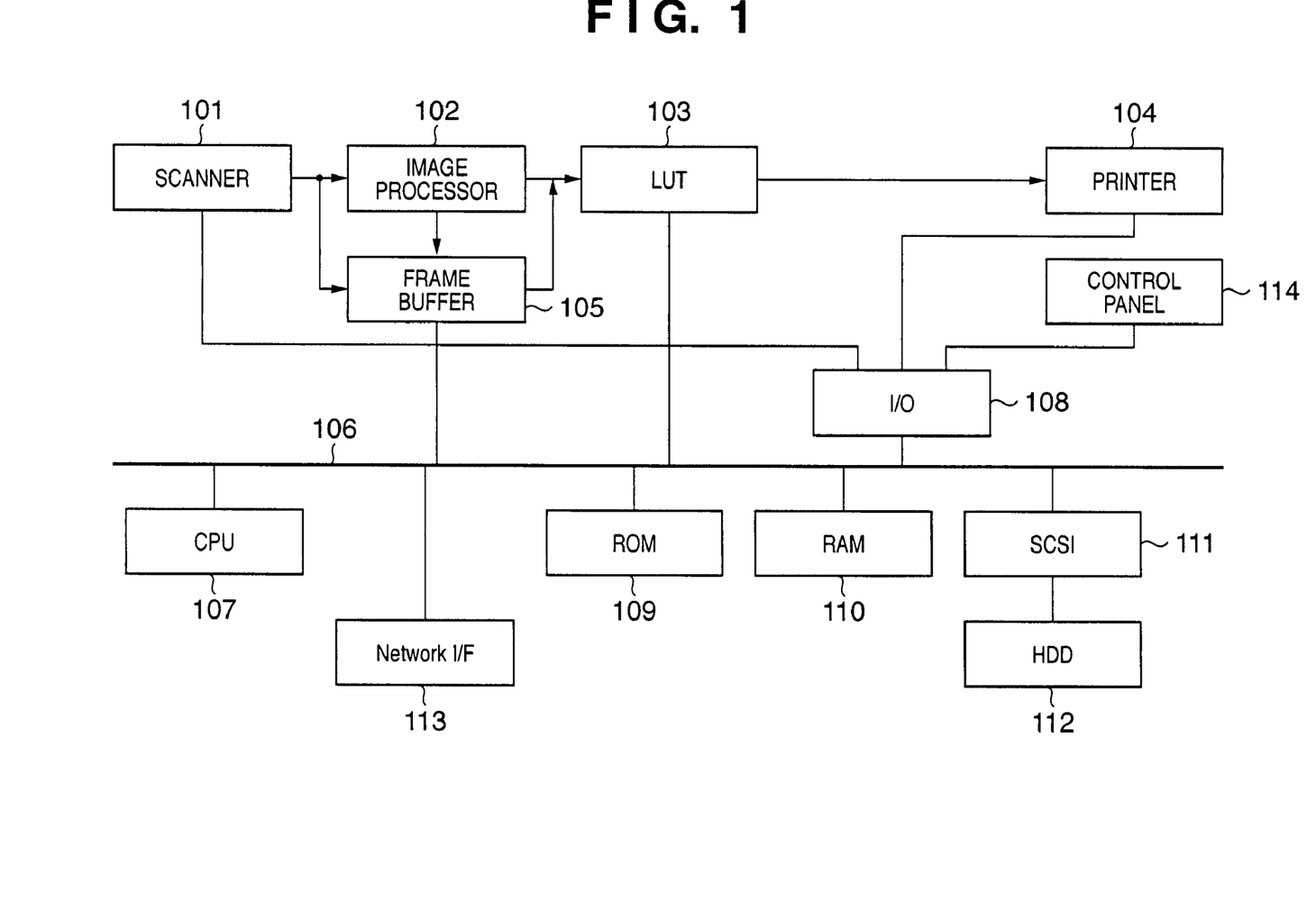
FIG. 1 is a block diagram illustrating the internal structure of a color copier according to an embodiment of the present invention.

FIG. 1 is an internal block diagram of the color copier 202 according to this embodiment. As shown in FIG. 1, the color copier 202 includes a scanner 101 for reading a document optically, converting the document to an electrical signal and generating RGB (Red, Green, Blue) digital data in which each pixel has 8-bit luminance information. This data is raster data having a resolution of 600 dpi in both the main and sub-scan directions.

An image processor 102 executes input masking processing, logarithmic conversion processing for conversion from RGB to CMYK, and output masking processing, toner reduction processing etc.

A look-up table (LUT) 103 has a conversion table for a conversion from eight bits to eight bits. The LUT 103 possesses independent tables for respective ones of the colors C, M, Y, K and is used in calibration for adjusting for individual differences between printers.

A printer 104 forms a color image by an electrophotographic method based upon field-sequential CMYK data that has been received.

A frame buffer 105 stores raster image data loaded from the scanner 101 and writes in the data under the control of a CPU 107. A frame buffer is provided for each color component.

A CPU bus 106 connects the CPU 107 with the other devices.

The CPU 107 controls the color copier. A Pentium III (registered trademark) chip having a frequency of 850 MHz manufactured by Intel Corporation is used as the CPU 107. Procedures (the details of which will be described later) shown in FIGS. 3 and 4 are executed by the CPU 107.

An input/output (I/O) port 108, which is connected to the CPU bus 106, controls the scanner 101 and printer 104 and input signals from various sensors (not shown).

Figure 3:
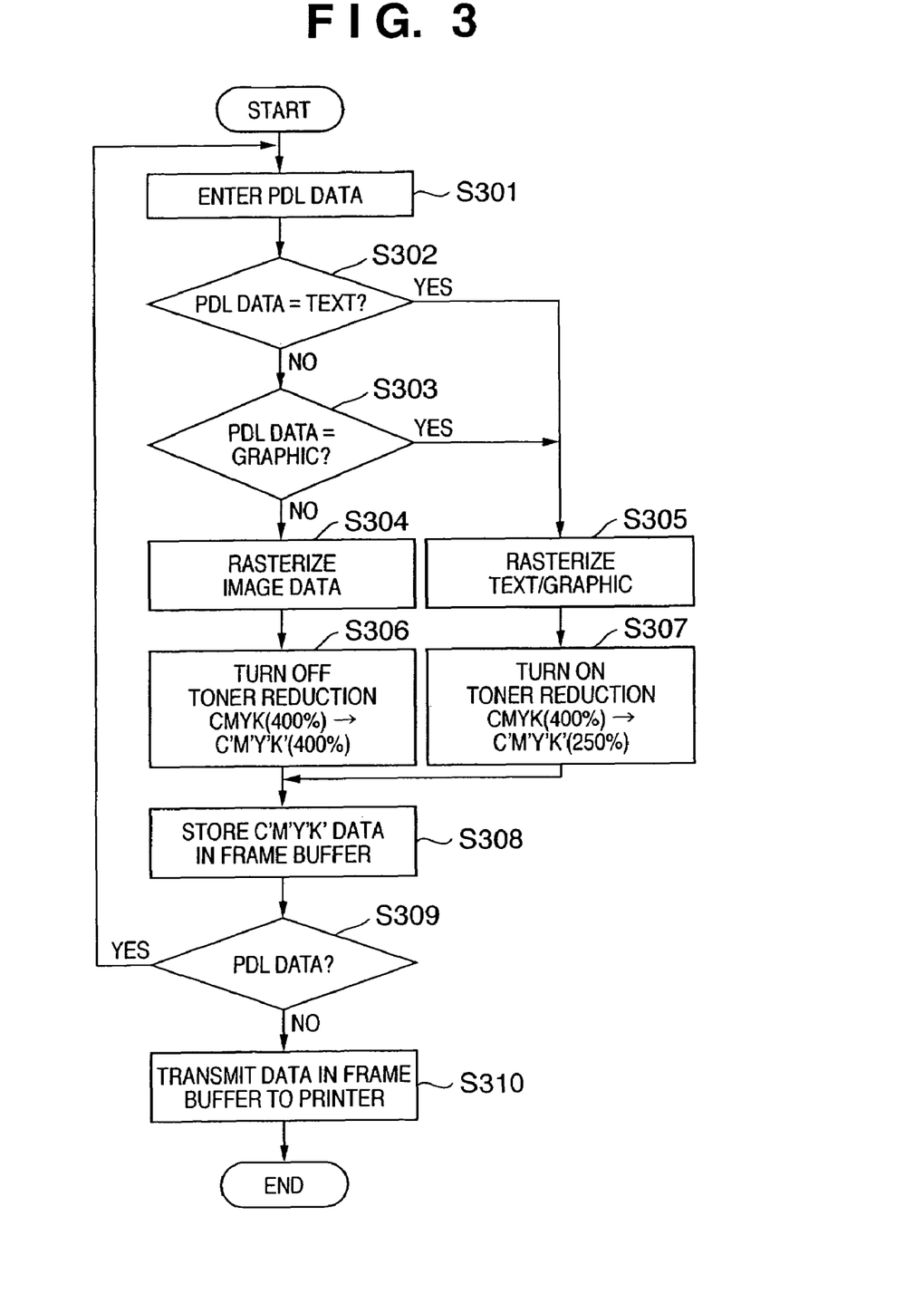
FIG. 3 is a flowchart illustrating a first embodiment of the present invention.
Figure 4:
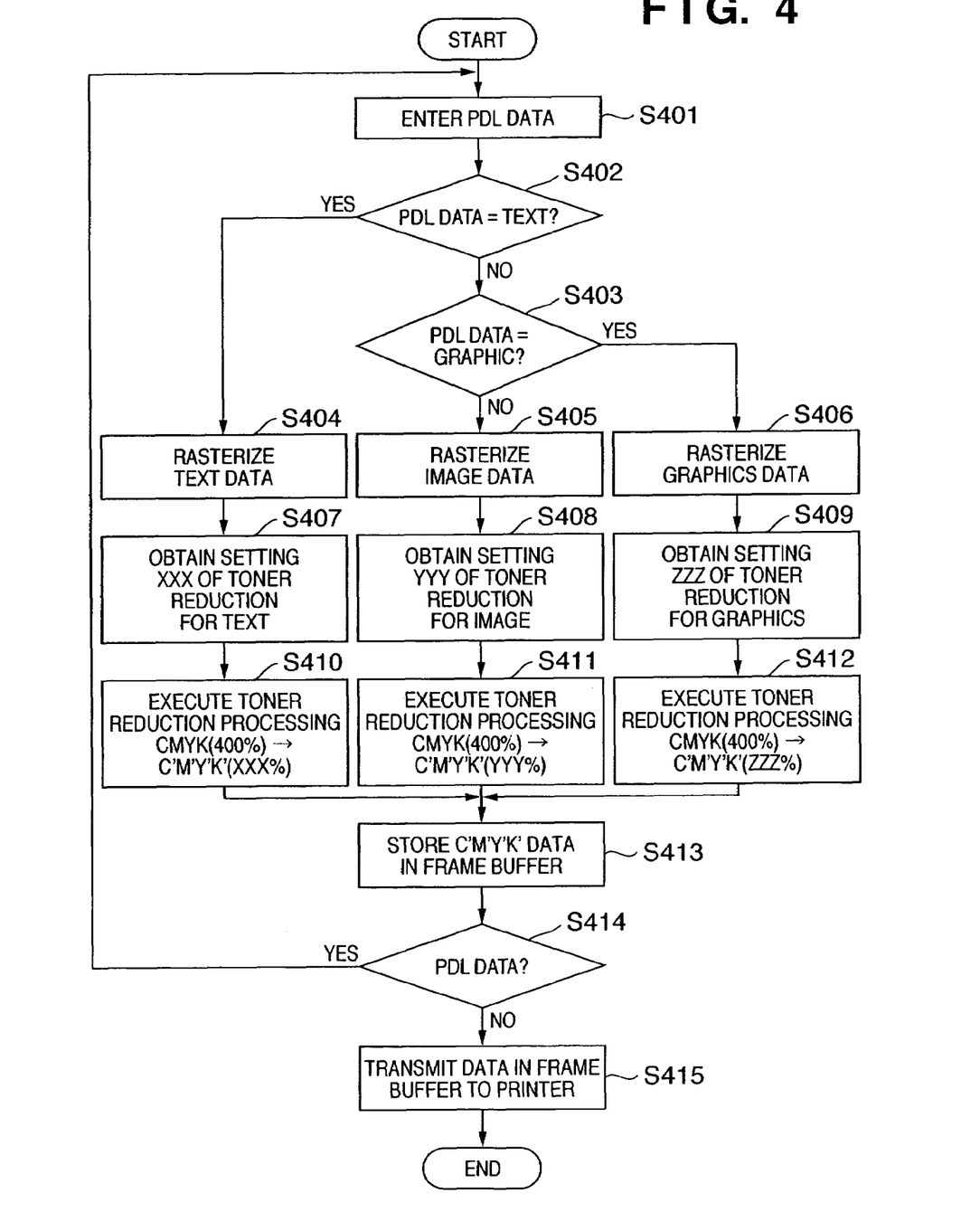
FIG. 4 is a flowchart illustrating a second embodiment of the present invention.

A ROM 109 stores a program that runs when this system is booted up as well as the procedures of FIGS. 3 and 4. The ROM 109 is connected to the CPU bus 106.

A work RAM 110 and an SCSI controller 111 are connected to the CPU bus 106.

A hard disk 112, which has a storage capacity of 9.1 GB, is a 3.5-inch hard-disk drive (HDD) connected to the SCSI controller 111.

A network interface (I/F) controller 113, which is connected to the CPU bus 106, is for being connected to an external 10BaseT, 100BaseT or 10Base5 Ethernet (registered trademark) network for the purpose of sending and receiving data.

The color copier has a control panel 114, which is equipped with an LCD panel, a touch-sensitive panel and buttons (none of which are shown).

The above arrangement exemplifies the structure of a manufactured product embodying the present invention and is not limited to the specific numerical values and product names mentioned above. A system to which the present invention is applicable can be constructed also using components having functions equivalent to those mentioned above.

Figure 6:
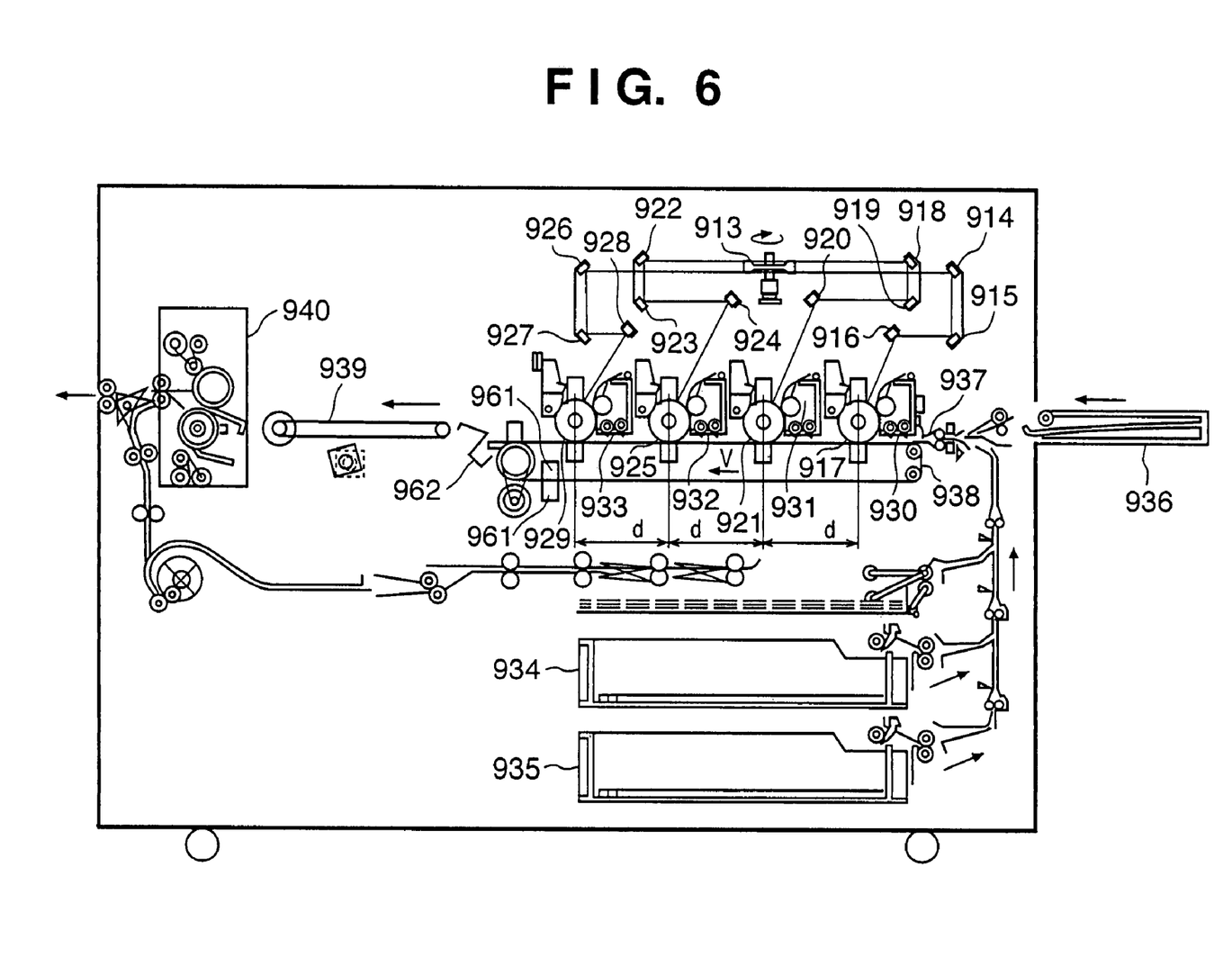
FIG. 6 is a sectional view of a color laser printer.

FIG. 6 is a side sectional view illustrating the printer 104 having the color copier 202. More specifically, FIG. 6 is a diagram showing the structure of a printer engine. As shown in FIG. 6, the apparatus includes a polygon mirror 913 that receives four laser beams emitted from semiconductor lasers, which are not shown. One of the laser beams scans a photosensitive drum 917 via mirrors 914, 915, 916, the next laser beam scans a photosensitive drum 921 via mirrors 918, 919, 920, the next a photosensitive drum 925 via mirrors 922, 923, 924, and the next a photosensitive drum 929 via mirrors 926, 927, 928.

A yellow developing unit 930 supplies toner of the color yellow (Y) and forms a Y-toner image on the photosensitive drum 917 in accordance with the laser beam. A magenta developing unit 931 supplies toner of the color magenta (M) and forms an M-toner image on the photosensitive drum 921 in accordance with the laser beam. A cyan developing unit 932 supplies toner of the color cyan (C) and forms a C-toner image on the photosensitive drum 925 in accordance with the laser beam. A black developing unit 933 supplies toner of the color black (K) and forms a K-toner image on the photosensitive drum 929 in accordance with the laser beam. A full-color output image can be obtained by transferring the toner images of the four colors (Y, M, C, K) to a sheet.

A paper sheet that has been fed from a sheet cassette 934 or 935 or from a manual insertion tray 936 is attracted to a transfer belt 938 and transported via a registration roller 937. The toner images of each of the four colors are developed on respective ones of the photosensitive drums 917, 921, 925, 929 in sync with the timing of paper feed, and the toner images are transferred to the sheet as the sheet is transported.

The sheet to which the toners of each of the colors have been transferred is separated from the transfer belt 938 and conveyed by a conveying belt 939, and the toner images are fixed to the sheet by a fixing unit 940. A sheet that has exited the fixing unit 940 is guided downward temporarily by a flapper 950. Then, when the trailing edge of the sheet exits the flapper 950, the sheet is switched back and ejected face-down. Accordingly, a group of sheets in ascending order is obtained when document images comprising a plurality of pages are printed sequentially from the top page.

It should be noted that the four photosensitive drums 917, 921, 925, 929 are spaced apart equally a distance d and that a sheet on the conveying belt 939 is conveyed at a fixed velocity v. Accordingly, the semiconductor lasers (not shown) are synchronized to these timings and driven color by color.

(Copying Operation)

A copying operation by the color copier having the structure of FIG. 2 will now be described with reference to FIG. 1.

When copying is performed, first the scanner 101 reads the document and generates RGB raster image data. This data is converted to data of each of the colors C, M, Y, K by the image processor 102, the image represented by the data is developed by the printer 104 via the LUT 103 and the image is output on printing paper. This operation is repeated in the order of the colors M, C, Y, K to form a color image.

In the case of the copying operation, a computation that will not allow the amount of applied toner of each color to exceed a stipulated value is performed when processing is executed by the image processor 102. This means that it is unnecessary to take toner reduction processing into consideration.

(Printing Operation)

The color copier 202 of FIG. 2 can also be utilized as a printer by the personal computer 201 connected to it via the network interface controller 113. The operation of the printer will be described with reference to FIG. 1.

When a user employs a printer driver on the personal computer 201 to execute printing by the color copier 202, the color copier 202 receives a job, which is described in PDL (page description language) such as Postscript or PCL, via the network interface controller 113 and stores this job in the work RAM 110. In addition, the description in PDL is interpreted by the CPU 107 to thereby generate a raster image, and the raster image is stored in the frame buffer 105. The raster image is developed by the printer 104 via the LUT 103 and is output on printing paper. This operation is repeated in the order of the colors M, C, Y, K to form a color image.

(Image Forming Processing)

Reference will be had to FIG. 3 to describe changeover of the toner-reduction processing mode according to the distinctive type of input data (image, graphic, text) in this embodiment. The processing procedure shown in FIG. 3 is executed under the control of the CPU 107 based upon a program that has been stored in the ROM 109 (or hard-disk drive 112). Toner reduction processing also is executed when a raster image is generated in the printer operation described above. The processing of FIG. 3 is executed for every page of a print job.

At step 301 in FIG. 3, PDL data (PCL, POSTSCRIPT, etc.) is read in. In general, PDL data is classified into the following three elements (a) to (c) below and the image data consists of combinations of these three elements:

(a) a description based upon character codes (text);

(b) a description based upon graphics codes (e.g., vector graphics codes, abbreviated to "graphics" below); and (c) a description based upon raster image data (a bitmap image, abbreviated to "image" below).

Figure 7:
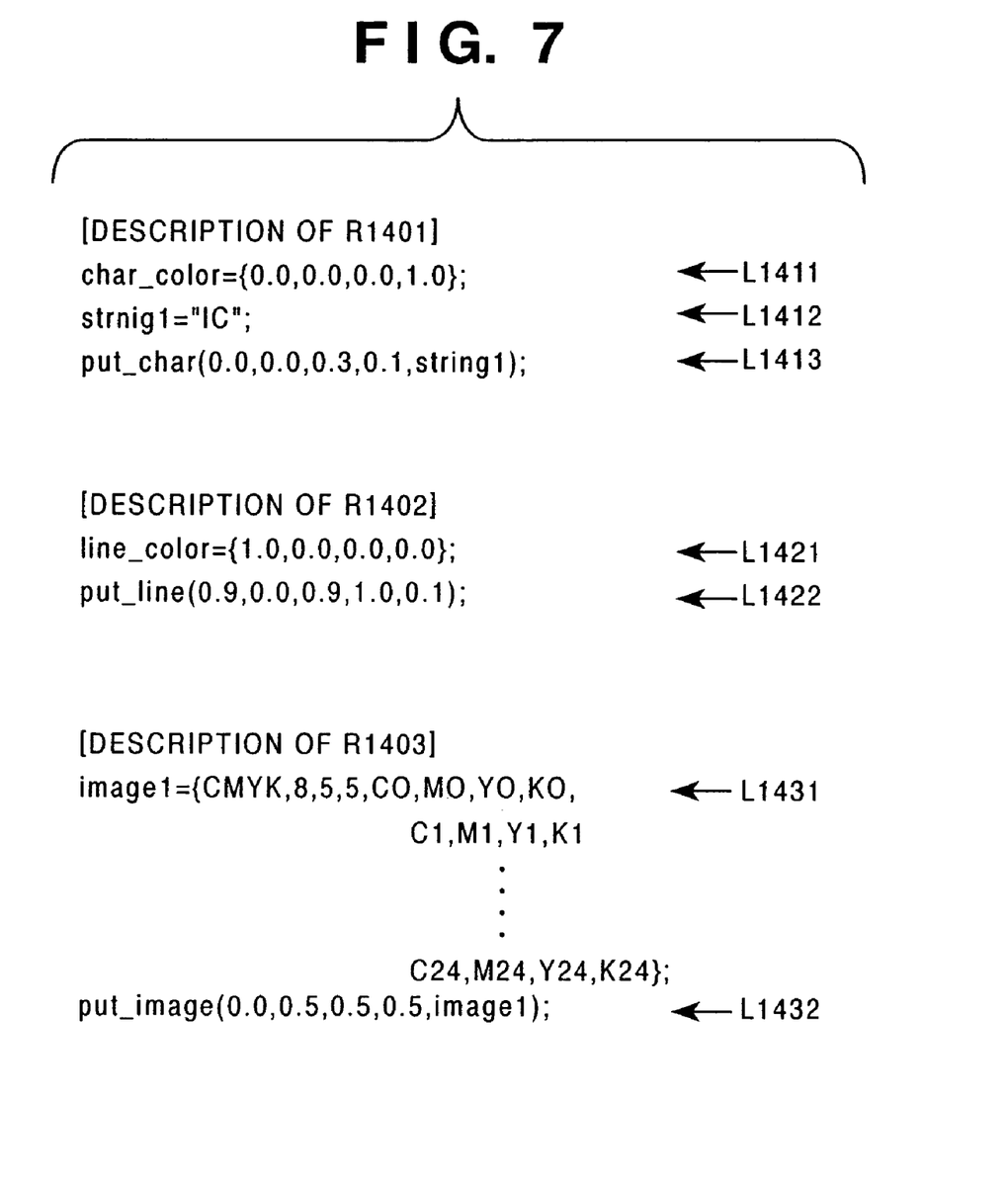
FIG. 7 illustrates examples of descriptions in PDL.

FIG. 7 illustrates examples of descriptions of text information, graphics information and image information based upon PDL. These descriptions correspond to respective ones of the three elements cited above.

The description at the top is an example of description of text information R1401. In this example of a description, line L1411 specifies the color of a character. On line L1411, the numerals in the parentheses represent the densities of cyan (C), magenta (M), yellow (Y) and black (K), respectively. The minimum and maximum density values are indicated by 0.0 and 1.0, respectively. Here it is indicated that the character is black. Next, on line L1412, a character code is defined by substituting the character string "IC" into a variable String1. Next, on line L1413, layout starting-position coordinates (x and y coordinates) of a character string on paper are indicated as first and second parameters, character size is indicated by a third parameter, character spacing is indicated by a fourth parameter, and the character string to be laid out is indicated by a fifth parameter. In accordance with L1413, therefore, "lay out character string 'IC' of size 0.3 and spacing 0.1 from position at coordinates (0.0,0,0) on paper" is specified.

The middle description in FIG. 7 is an example of description of raster image information R1402. In this example of a description, line L1421 specifies the color of a line in a manner similar to that of L1411. Here it is indicated that the graphic is to be made cyan. Next, on line L1422, underlining is specified, coordinates (x,y) of the starting end of the line are indicated by first and second parameters, and coordinates (x,y) of the end of the line are indicated by third and fourth parameters. Further, line thickness is indicated by a fifth parameter.

The description at the bottom of FIG. 7 is an example of description of raster image information R1403. On line L1413, a raster image is substituted into a variable image 1. Here a first parameter represents the image type and number of color components of the raster image, a second parameter represents the number of bits per component, third and fourth parameters represent the sizes of the raster image along the x and y directions, respectively. Parameters from a fifth parameter onward are raster image data. The number of items of raster image data is the product of number of color components constituting one pixel and the sizes of the image along the x and y directions. In accordance with line L1431, the raster image is composed of four color components (C, M, Y, K) and therefore the number of items of raster image data is (4×5×5)=100. The next line L1432 indicates "lay out image1 of size 0.5×0.5 from position at coordinates (0.0,0.5) on paper".

Thus, in PDL, the description is such that the type of input data, i.e., the type of object, can be identified by the command.

At step 302, whether the PDL data is text is determined by analyzing the PDL command. Next, at step 303, it is similarly determined whether the PDL data is graphics data. If the PDL data is neither text nor graphics data, then the data will be image data and the image data is rasterized, therefore, at step 304. In this embodiment the assumption is that it is better not to apply toner reduction to the image data in order to obtain an output more in line with expectations. Accordingly, at step 306, the entered CMYK values are held as is without applying toner reduction processing, and at step 308 the values are stored in the frame buffer 105 mentioned earlier.

Here the rasterizing of the image data is executed in accordance with the color, position and size, etc., specified by the PDL parameters. It should be noted that in a case where color is specified not by CMYK but by RGB or Lab, etc., a conversion to CMYK color space is performed by a color conversion using a certain conversion matrix. Toner reduction processing will be described later.

If the PDL data is text or graphics, on the other hand, the data is rasterized at step 305 and then, because this embodiment assumes that it is better to apply toner reduction processing in order to enable toner spray to be prevented, 250% toner reduction processing is applied to the entered CMYK data at step 307 to obtain C'M'Y'K'. At step 308, the C'M'Y'K' data is stored in frame buffers for each of the corresponding color components.

If the C'M'Y'K' data is thus stored in the frame buffers, it is determined at step 309 whether PDL data of the page being processed still remains. If PDL data still remains, then similar processing is executed again from step 301. If PDL data no longer remains, this means that the processing of this page has ended. Accordingly, the data in the frame buffers is transmitted to the printer 104 at step 301 and one page is printed.

This flowchart describes an example for one page of data. If there are a plurality of pages of data, such data can be dealt with by applying the processing of FIG. 3 to all of these pages. Further, this embodiment has been described for a case where toner reduction processing is applied only to text and graphics data and not to image data. However, the present invention can also be applied to a case where any one or two of image, text and graphics are subjected to toner reduction.

Figure 5:
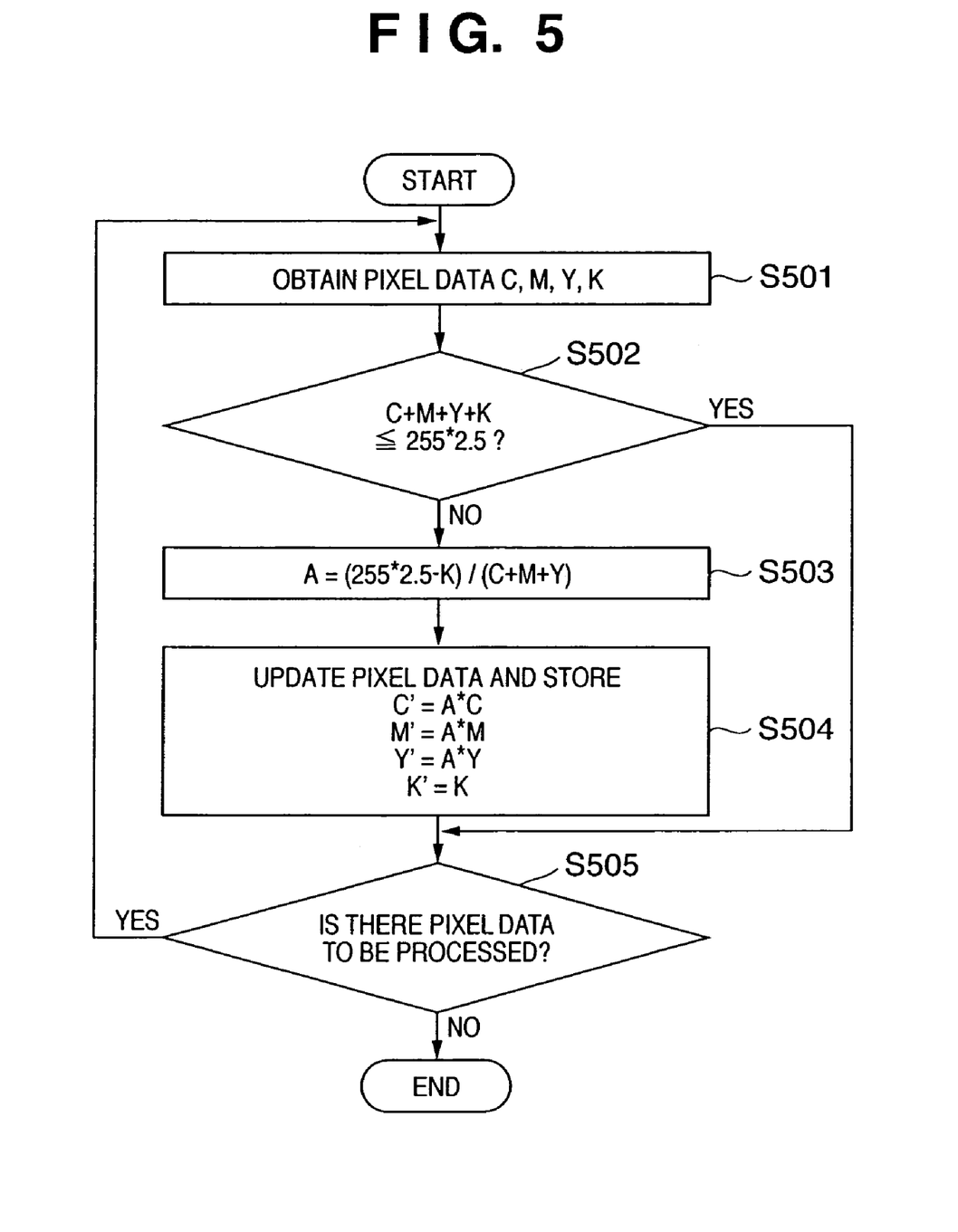
FIG. 5 is a flowchart illustrating toner reduction processing according to the present invention.

Next, the toner reduction processing at step 307 in FIG. 3 will be described with reference to FIG. 5. The processing procedure shown in FIG. 5 is executed under the control of the CPU 107 based upon a program that has been stored in the ROM 109 (or hard-disk drive 112).

First, at step 501, the values of pixel data CMYK are obtained taking as the pixel of interest a pixel at the beginning of the image data being rasterized. This data is composed of eight bit per color. It is then determined at step 502 whether the sum total of the CMYK values exceeds 255×2.5, namely 250% of the amount of toner applied. With regard to amount of toner applied, a state in which the toner of a certain single color is applied in full (i.e., a state in which the value is 255) is defined as being 100%. This shall be referred to as the "toner application rate". That is, the total of toner application rates in a state where the four colors C, M, Y, K are applied in full is 400%. In this embodiment, it is assumed that suppressing the total toner application rate to 250% or less is preferable with regard to text and graphics data. The upper limit on the total of toner application rates shall be referred to as the "toner reduction rate". The reduction rate in the example of FIG. 3 is assumed to 250%. That is, the processing executed at step 502 is similar to comparing the total of the toner application rates of the pixel of interest with the toner reduction rate. Of course, if the upper limit of the value of each color component is given, a similar determination can be made based upon amount of toner applied and amount of toner reduction (a value obtained by multiplying the toner reduction rate by the upper limit value for each color component) instead of the toner application rate and toner reduction rate.

In case of a pixel for which the toner application rate is 250% or less, it is unnecessary to perform the toner reduction and control therefore proceeds to step 505. If the toner application rate is greater than 250%, then toner reduction processing is executed.

More specifically, at step 503, a coefficient A=(255×2.5−K)/(C+M+Y) is calculated. Then, at step 504, only C, M, Y are multiplied by the coefficient A to convert the pixel data. At this time K is not converted. If the definition of the coefficient A is generalized, we may write A=[(maximum value of each color component)×(toner reduction rate)−(value of black component of pixel of interest)]/(total value of values of color components other than black)]. That is, the coefficient A signifies the rate at which reduction should be applied to color components other than black in order to contain the toner application rate within the toner reduction rate while holding the black component at the prevailing value. Accordingly, if it is necessary to retain a value with regard to a color other than black, then the value of this color component also is excluded from (maximum value of each color component)×(toner reduction rate) instead of the black component or in addition to the black component. Further, in a case where use is made of so-called process black, which represents the black component by a combination of other components, exclusion of the black component is unnecessary.

Thus, the amount of toner applied is such that the total of the toner application rates of each of the colors is rounded to within 250% while maintaining balance among C, M, Y.

It is determined at step 505 whether pixel data to be processed still exists. If pixel data still exists, then the pixel of interest is advanced to the next pixel and control returns to step 501. Toner reduction processing can be executed by carrying out this series of process steps.

Thus, in accordance with this embodiment, the type of object to undergo image formation is discriminated based upon data, e.g., PDL data, transmitted from a host computer, and whether toner reduction processing is to be applied or not is decided in accordance with the type of object discriminated. Specifically, toner reduction is applied if an object is text or graphics but is not applied if the object is a bitmap image. This makes it possible to prevent damage to the apparatus and a decline in image quality by executing toner reduction with regard to text and images that tend to cause damage to the apparatus or a decline in image quality when the amount of toner applied is excessive. On the other hand, the original image can be reproduced faithfully without applying toner reduction with regard to a bitmap image that does not readily cause apparatus damage or deterioration of image quality ascribable to excessive application of toner. Thus, the image forming apparatus according to this embodiment is capable of forming a high-quality image irrespective of the type of object.

Second Embodiment

Image data is generated through a procedure different from that of the first embodiment in a copier having a structure similar to that of the first embodiment.

Reference will be had to FIG. 4 to describe a method in which a plurality of toner-reduction setting values are provided for every distinctive type of input data (images, graphics, text) and toner reduction processing is executed using a setting value from among these values. The processing procedure of FIG. 4 is executed under the control of the CPU 107 based upon a program that has been stored in ROM 109 (or hard-disk drive 112). If there are a plurality of pages of print data, the processing of FIG. 4 is executed page by page.

First, at step 401, PDL data (PCL, POSTSCRIPT, etc.) is read in. At step 402, whether the PDL data is text is determined by analyzing the PDL command.

If the data is text data, the text data is rasterized at step 404. Next, at step 407, a setting XXX of toner reduction for dealing with the text data is obtained. Then, at step 410, actual toner reduction processing is executed using the value XXX obtained at step 407 and values of C', M', Y', K' are obtained. The toner reduction processing executed here is performed by a method identical with that described in the first embodiment. However, whereas the toner reduction rate is fixed at 250% in FIG. 5, XXX becomes the toner reduction rate with regard to text in this embodiment. The values of C', M', Y', K' obtained through the processing of step 410 are stored in the frame buffer 105 at step 413.

If it is found at step 402 that the entered PDL data is not text data, then it is determined at step 403 whether the PDL data is graphics data. If the entered PDL data is not graphics data, this means that the data is image data and the image data is rasterized, therefore, at step 405. Next, at step 408, a setting YYY of toner reduction for dealing with the image data is obtained. Then, at step 411, actual toner reduction processing is executed using the value YYY obtained at step 408. The toner reduction processing executed here is similar to the toner reduction processing in the case of text described above. The only difference is whether the value used is XXX or YYY. The values of C', M', Y', K' obtained through the processing of step 411 are stored in the frame buffer 105 at step 413.

Next, if graphics data is discriminated at step 403, then the graphics data is rasterized in similar fashion at step 406 and a setting ZZZ of toner reduction for dealing with the graphics data is obtained at step 409. Then, at step 412, actual toner reduction processing is executed using the value ZZZ obtained at step 409. The toner reduction processing executed here also is similar to the processing that was applied to the text and image data above, with the only difference being the value ZZZ. The values of C', M', Y', K' obtained at step 412 are stored in the frame buffer 105 at step 413.

Next, it is determined at step 414 whether PDL data to be processed still remains. If PDL data to be processed still remains, processing from step 401 onward is repeated until there is no longer any PDL data. If PDL data to be processed no longer exists, then one page of data is output by transmitting the data in the frame buffer to the printer 104 at step 415.

This flowchart describes an example in which there is one page of data. If there are a plurality of pages of data to be processed, such data can be dealt with by applying the processing of FIG. 4 to all of these pages. Further, according to this embodiment, the values XXX, YYY, ZZZ are used as the values of toner reduction. However, these values may be specified by the control panel 114 or may be designated from the host computer 201 at the same time as the PDL data. They may also be given in advance.

Further, by setting the values of XXX, YYY, ZZZ to, e.g., 230%, 400%, 250%, respectively, the appropriate toner reduction processing can be applied with regard to text and graphics without toner reduction processing being applied to images, i.e., photographic images.

Further, if, e.g., 170%, 200%, 200% are set as the values of XXX, YYY, ZZZ, respectively, toner spray becomes noticeable in the vicinity of thin lines and the user turns a thin-line correction mode ON from the printer driver or control panel, then appropriate toner reduction processing can be applied by setting, e.g., 170%, 200%, 170% as the values of XXX, YYY, ZZZ, respectively, in response to the activation of this correction mode.

By virtue of the above arrangement, the color copier of this embodiment is capable of executing toner reduction processing in accordance with a toner reduction rate that conforms to the type of object to undergo image formation. As a result, by suitably setting the toner reduction rate, it is possible to prevent a decline in image quality and damage to the apparatus ascribable to excessive application of toner.

It should be noted that the first embodiment can also be implemented by setting XXX and ZZZ of this embodiment to 250% and setting YYY to 400%. That is, the second embodiment can be construed as being an extension of the first embodiment. Setting the toner reduction rate to 400% (the maximum value allowed with regard to all of the color components) is equivalent to specifying that no toner reduction is to be applied.

(First Modification)

A color copier has been described in the above embodiments. However, since toner reduction processing is a function that is useful in a case where the device functions as a printer, the present invention is applicable to an apparatus capable of being utilized as a color printer, such as a color printer or color facsimile machine.

(Second Modification)

Furthermore, the embodiments have been described in regard to an electrophotographic copier. However, in regard to a printer of the type where image quality declines if the amount of colorant exceeds a fixed amount, the present invention is applicable irrespective of the image forming method.

(Third Modification)

In the embodiments, the type of object is discriminated based upon a PDL command. In a case where bitmap image data has been applied, however, the object included can also be discriminated by analyzing the content of this data. In this case, the edges of images, for example, are detected and the processing of FIG. 3 or 4 is applied in accordance with the type of object discriminated by image analysis processing, with an object being regarded as text or graphics if the density or spacing of detected images exceeds a certain value.

(Fourth Modification)

Furthermore, as shown in FIG. 7, text and graphics data has its color specified as parameters and the image is formed uniformly of the specified color. In a case where the specified color has been rasterized, it is determined prior to rasterization whether the toner application rate has exceeded the toner reduction rate and, if the toner reduction rate has been exceeded, the color may be converted to one that falls within the toner reduction rate. That is, in the first embodiment, the processing of FIG. 5 is executed with regard to the specified color and toner reduction processing is applied to the specified color in advance prior to rasterization if the type of object is text or graphics. The object is then rasterized using the color prevailing after the above processing. By performing this operation, it is no longer necessary to apply the toner reduction one pixel at a time and therefore processing can be speeded up. The same is true with regard to the second embodiment. However, since the toner reduction is applied also to image data in the second embodiment, it is required that toner reduction processing be executed pixel by pixel in regard to image data.

Fifth Embodiment

Furthermore, in the first embodiment, it is possible to provide designating means for designating, from the control panel 114 or PC 201, whether toner reduction is to be carried out. If application of toner reduction has been designated in such case, this fact is stored as data, it is determined whether a designation to perform toner reduction in the procedure of FIG. 5 has been made, and the procedure of FIG. 5 is executed only if the designation has been made. If the designation has not been made, then the procedure of FIG. 5 is exited without any processing being performed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Thus, in accordance with the present invention as described above, amount of colorant can be controlled suitably in accordance with the type of object whose image is to be formed. This makes it possible to improve the quality of the image formed and to prevent damage to the apparatus.

Furthermore, a more effective image output can be obtained by making it possible to specify the amount of colorant for every type of identical object.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
    a first determination unit configured to determine a type of an object contained in input data;
    a second determination unit configured to determine, in a case where the type of the object contained in the input data is determined by said first determination unit to be a text type or a graphic type, whether or not an amount of colorant of a specified color exceeds a first colorant amount when the specified color contained in the input data has been rasterized;
    a conversion unit configured to convert, when it is determined by said second determination unit that the amount of colorant of the specified color exceeds the first colorant amount, the specified color into a color with an amount of colorant that falls within the first colorant amount;
    a rasterizing unit configured to rasterize the text type or graphic type object contained in the input data with a color converted or not converted by said conversion unit, and rasterize an image type object contained in the input data without determination by said second determination unit and conversion by said conversion unit; and
    a processing unit configured to set,
        i) when the type of the object rasterized by said rasterizing unit is the graphic type and a fine line correction mode is not selected based on a user operation, an amount of colorant of the graphic type object to the first colorant amount,
        ii) when the type of the object rasterized by said rasterizing unit is the graphic type and a fine line correction mode is selected based on a user operation, an amount of colorant of the graphic type object to the second colorant amount which is smaller than the first colorant amount, and
        iii) when the type of the object rasterized by said rasterizing unit is the text or image type, an amount of colorant of the text or image type object to the first colorant amount independent of whether or not the fine line correction mode is selected based on the user operation.

2. The apparatus according to claim 1, wherein said first determination unit determines the type of object based upon an instruction contained in image data described in page description language.

3. An image forming method comprising:
    a first determination step of determining, using a first determination unit, a type of an object contained in input data;
    a second determination step of determining, using a second determination unit, in a case where the type of the object contained in the input data is determined in said first determining step to be a text type or a graphic type, whether or not an amount of colorant of a specified color exceeds a first colorant amount when the specified color contained in the input data has been rasterized;
    a conversion step of converting, using a conversion unit, when it is determined in said second determining step that the amount of colorant of the specified color exceeds the first colorant amount, the specified color into a color with an amount of colorant that falls within the first colorant amount;
    a rasterizing step of rasterizing, using a rasterizing unit, the text type or graphic type object contained in the input data with a color converted or not converted in said converting step, and rasterizing an image type object contained in the input data without determination in said second determination step and conversion in said converting step; and
    a processing step of setting, using a processing unit,
        i) when the type of the object rasterized in said rasterizing step is the graphic type and a fine line correction mode is not selected based on a user operation, an amount of colorant of the graphic type object to the first colorant amount, ii) when the type of the object rasterized in said rasterizing step is the graphic type and a fine line correction mode is selected based on a user operation, an amount of colorant of the graphic type object to the second colorant amount which is smaller than the first colorant amount, and iii) when the type of the object rasterized in said rasterizing step is the text or image type, an amount of colorant of the text or image type object to the first colorant amount independent of whether the fine line correction mode is selected or not based on the user operation.

4. The method according to claim 3, wherein said first determination step determines the type of object based upon an instruction contained in image data described in page description language.

5. A computer program stored on a computer-readable medium for instructing a computer to execute an image forming method, said method comprising:

a first determination step of determining a type of an object contained in input data;

a second determination step of determining, in a case where the type of the object contained in the input data is determined in said first determining step to be a text type or a graphic type, whether or not an amount of colorant of a specified color exceeds a first colorant amount when the specified color contained in the input data has been rasterized;

a conversion step of converting, when it is determined in said second determining step that the amount of colorant of the specified color exceeds the first colorant amount, the specified color into a color with an amount of colorant that falls within the first colorant amount;

a rasterizing step of rasterizing the text type or graphic type object contained in the input data with a color converted or not converted in said converting step, and rasterizing an image type object contained in the input data without determination in said second determination step and conversion in said converting step; and a processing step of setting, i) when the type of the object rasterized in said rasterizing step is the graphic type and a fine line correction mode is not selected based on a user operation, an amount of colorant of the graphic type object to the first colorant amount, ii) when the type of the object rasterized in said rasterizing step is the graphic type and a fine line correction mode is selected based on a user operation, an amount of colorant of the graphic type object to the second colorant amount which is smaller than the first colorant amount, and iii) when the type of the object rasterized in said rasterizing step is the text or image type, an amount of colorant of the text or image type object to the first colorant amount independent of whether the fine line correction mode is selected or not based on the user operation.

* * * * *